3,704,303
6,7,8,9 - TETRAHYDROPYRIMIDO[2,1-b] - BENZO-
THIAZOLE-6-CARBOXYLIC ACID, ALKYL ESTERS
Peter H. L. Wei, Springfield, Pa., assignor to American
Home Products Corporation, New York, N.Y.
No Drawing. Filed Mar. 17, 1971, Ser. No. 125,375
Int. Cl. C07d 99/10
U.S. Cl. 260—256.5 R                                    1 Claim

ABSTRACT OF THE DISCLOSURE

A novel series of compounds is described which are pharmacologically active as antiinflammatory agents. The compounds are characterized as the lower alkyl esters of 6,7,8,9-tetrahydropyrimido[2,1-b]-benzothiazole - 6 - carboxylic acid.

DESCRIPTION OF THE INVENTION

This invention is directed to novel chemical compounds which are pharmacologically active as antiinflammatory agents.

The compounds of the invention are those of Formula I

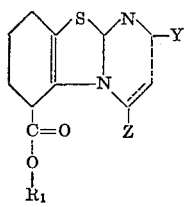

I wherein Y and Z are different and are oxygen or acetamido; the dotted lines indicate the presence or absence of a double bond and $R_1$ is lower alkyl. The exact configuration of the compounds of the invention has not been ascertained but the compounds of the invention exist in one of the following structures:

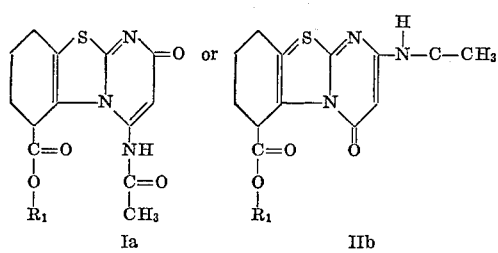

Ia                              IIb wherein $R_1$ is lower alkyl.

The compounds of the invention may be prepared by the following reaction scheme:

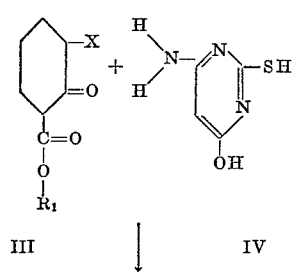

III        |        IV

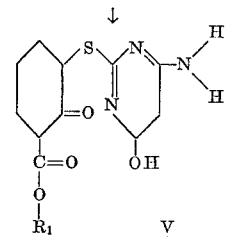

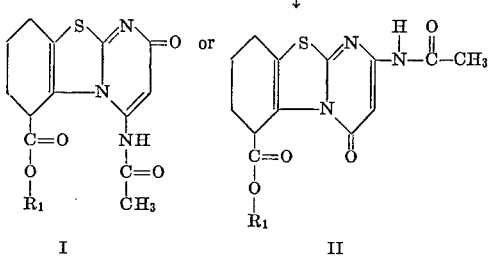

I                               II wherein $R_1$ is lower alkyl and is halogen.

Those skilled in the art will appreciate that since the compounds of the invention are obtained through ring closure of compounds of Formula V, there is no absolute method of predicting what that exact structure of the final product will be. The reason for this is the carbon bearing the ketone carbonyl may cyclize with either nitrogen of the pyrimido ring. For this reason the alternate nomenclature has been employed.

The process of the invention involves first the condensation of compounds of Formulae III and IV to form a compound of Formula V. The reaction of the compounds of Formulae III and IV is conducted in absolute ethanol in the presence of an alkali metal hydroxide at room temperature for a period of 15 to 24 hours. The solid material containing inorganic salt after removal of the solvent, is washed with water and recrystallized from acetonitrile. The intermediate compound of Formula V is ring-closed in the presence of a dehydrating agent such as acetic anhydride by heating for about 5 to about 10 hours at a temperature of about 100 to about 150° C. The crude material which is obtained after solvent removal may be purified by recrystallization from a suitable solvent. As used herein, the term lower alkyl is used to include hydrocarbon groups such as methyl, ethyl, n-propyl, i-propyl and n-butyl. The term halogen is used to include chlorine and bromine.

The compounds of the invention are useful antiinflammatory agents which may be employed in comparative and experimental pharmacology as well as for other purposes. Those skilled in the art readily realize the desirability of employing control compounds which have demostrated efficacy for inducing specific pharmacological effects when compounds of unknown activity are tested.

Activity of the compounds of the invention have been established by their ability to inhibit experimentally induced edema in the hind paw of the rat. Male Sprague-Dawley rats 120–160 grams are used. The compound is administered orally as a dispersion in distilled water (plus 2 drops of Tween 80) in a volume of 10 ml./kg. Compounds are given to 6 rats and vehicle alone is administered to 6 more rats as a control. Sixty minutes later, drug administration edema is induced by an injection of 0.05 ml. of a 1% carrageenin solution in physiological saline into the subplantar tissue of the rat's hind paw. Paw volume is then immediately measured volumetrically mith a plethysmograph and again 3 hours later. The new volume of swelling for the control group is calculated and compared to the test groups. Compounds that inhibit swelling approximately 23% in compound treated subjects are considered active. Inhibition is calculated by the formula:

Percent Inhibition
$$= \frac{\text{Mean volume swelling of vehicle treated subject} - \text{Mean volume swelling of compound}}{\text{Mean volume swelling of vehicle tested subject}} \times 100$$

The compounds of the invention are active antiinflammatory agents when administered orally to mammals at dosages of 100 milligrams per kilogram of body weight. The above test is an art recognized test for antiinflammatory screening and evaluation. (Winter et al., Proc. Soc. Exp. Biol. and Med. 111:544, 1962; Buttle et al., Nature 179:629, 1957.)

The following example is added to illustrate but not to limit the scope of the invention.

EXAMPLE I

4(2) - acetamido - 6,7,8,9 - tetrahydro - 2(4) - oxo - 4H-pyrimido[2,1 - b]benzothiazole-6-carboxylic acid, ethyl ester To an alcoholic solution of 6-bromo-2-carbethoxy cyclohexanone (25.0 g. or .10 m.) and 4 - amino - 6-hydroxy - 2 - mercapto pyrimidine monohydrate (17.7 g. or 0.10 m.) was added an alcoholic solution of KOH (5.6 g. or 0.10 m.). The mixture was stirred at room temperature overnight. The solid was collected. By concentration of the filtrate more solid was collected. The above solids were combined and washed with water to remove the inorganic material. The crude organic material was recrystallized from acetonitrile to give 15.0 g. of 4-amino-2-(3-carbethoxy-3-ketocyclohexane)ylthio-6-hydroxypyrimidine, which had a melting point range of 190–200°.

The above mercapto compound (7.5 g. or 0.024 m.) was heated to reflux in 100 ml. of acetic anhydride for 8 hours. After removal of the solvent the residue was treated with benzene and solid was collected. The crude material was recrystallized from benzene to give 3.6 g. It had a melting point of 194–6°.

Analysis.—Calcd. for $C_{15}H_{17}N_3O_4S$ (percent): C, 53.71; H, 5.11; N, 12.53; S, 9.56. Found (percent): C, 53.54; H, 4.96; N, 12.66; S, 9.84.

Absorption spectrum: The infrared absorption (KBr) is as follows: NH, 3.1μ; three distinct carbonyls: ester at 5.75μ, six membered lactam at 5.85μ and amide at 6.0μ, also strong amide II at 6.7μ. NMR (DMSO): ester signal a triplet at δ 1.2 and δ 1.6 and quartet at δ 4.1 and δ 4.4; amido methyl, a singlet at δ 2.2; and one aromatic proton at δ 7.0 and one exchangeable proton at δ 8.6; other aliphatic protons were scattered between δ 1.8 and δ 2.8.

By methods analogous to those employed above, the homologous methyl, propyl and butyl esters may be prepared.

What is claimed is:
1. A compound, structurally depicted by one of the formulae:

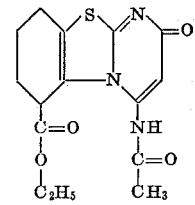

or

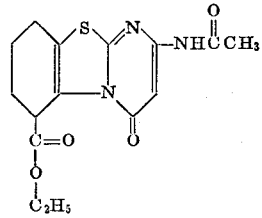

said compound having the following properties:
(a) empirical formula: $C_{15}H_{17}N_3O_4S$.
(b) absorption spectrum: The infrared absorption (KBr) is as follows: NH, 3.1μ: three distinct carbonyls: ester at 5.75μ, six membered lactam at 5.85μ and amide at 6.0μ, also strong amide II at 6.7μ.
(c) NMR (DMSO): ester signal a triplet at δ 1.2 and δ 1.6 and quartet at δ 4.1 and δ 4.4; amido methyl, a singlet at δ 2.2; and one aromatic proton at δ and one exchangeable proton at δ 8.6; other aliphatic protons were scattered between δ 1.8 and δ 2.8.
(d) melting point: about 194 to about 196° C.

References Cited

UNITED STATES PATENTS 3,538,086  11/1970  Mair et al. _____ 260—256.5 R

ALEX MAZEL, Primary Examiner

R. J. GALLAGHER, Assistant Examiner

U.S. Cl. X.R.

260—999